(No Model.) 4 Sheets—Sheet 1.

H. S. WOODWARD.
DECORTICATING MACHINE.

No. 337,469. Patented Mar. 9, 1886.

WITNESSES:
Robert M. Foust.
Harry Bottomley.

INVENTOR
Henry Slaughter Woodward
per E. Henry Roney
ATTORNEY (No Model.) 4 Sheets—Sheet 2.

H. S. WOODWARD.
DECORTICATING MACHINE.

No. 337,469. Patented Mar. 9, 1886.

WITNESSES:
Robert M. Foust
Harry Bottomley

INVENTOR
Henry Slaughter Woodward
per C Henry Roney
ATTORNEY (No Model.) 4 Sheets—Sheet 3.

H. S. WOODWARD.
DECORTICATING MACHINE.

No. 337,469. Patented Mar. 9, 1886.

WITNESSES:
Robert M. Foust.
Harry Bottomley

INVENTOR
Henry Slaughter Woodward
per C. Henry Roney
ATTORNEY (No Model.) 4 Sheets—Sheet 4.

H. S. WOODWARD.
DECORTICATING MACHINE.

No. 337,469. Patented Mar. 9, 1886.

WITNESSES:
Robert M. Foust.
Harry Bottomley.

INVENTOR
Henry Slaughter Woodward
per C. Henry Roney
ATTORNEY

UNITED STATES PATENT OFFICE.

HENRY S. WOODWARD, OF PHILADELPHIA, PENNSYLVANIA.

DECORTICATING-MACHINE.

SPECIFICATION forming part of Letters Patent No. 337,469, dated March 9, 1886.

Application filed May 22, 1883. Renewed July 23, 1885. Again renewed February 10, 1886. Serial No. 191,461. (No model.)

*To all whom it may concern:*

Be it known that I, HENRY SLAUGHTER WOODWARD, a citizen of the United States, residing at Philadelphia, in the county of Philadelphia and State of Pennsylvania, have invented certain new and useful Improvements in Decorticating-Machines; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to machinery specially adapted to removing the bark or cuticle from cacti, bromelia, agave, and other fibrous plants of the cacti species. I attain this object by the mechanism illustrated in the accompanying drawings, in which—

Figure 1:
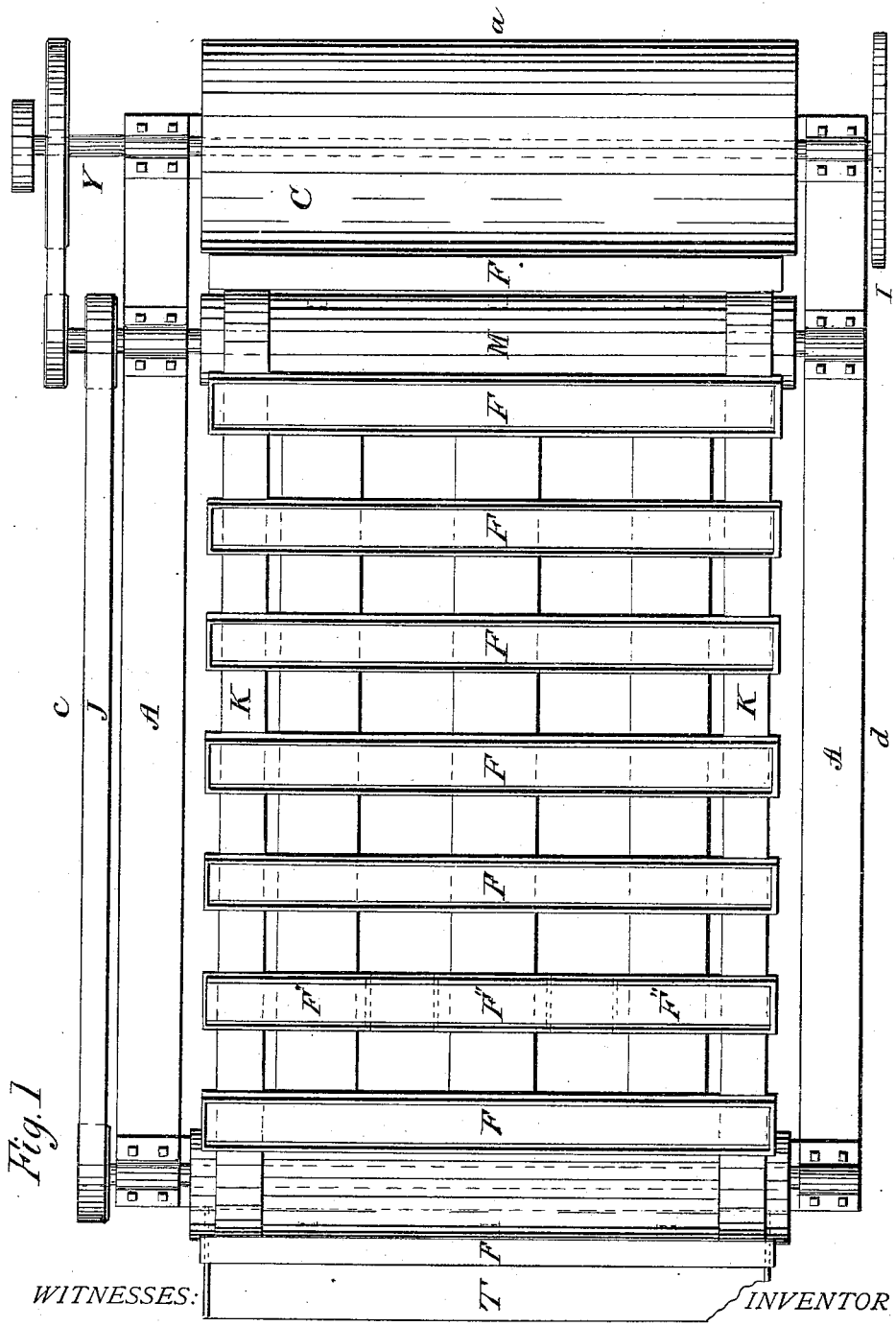
Figure 2:
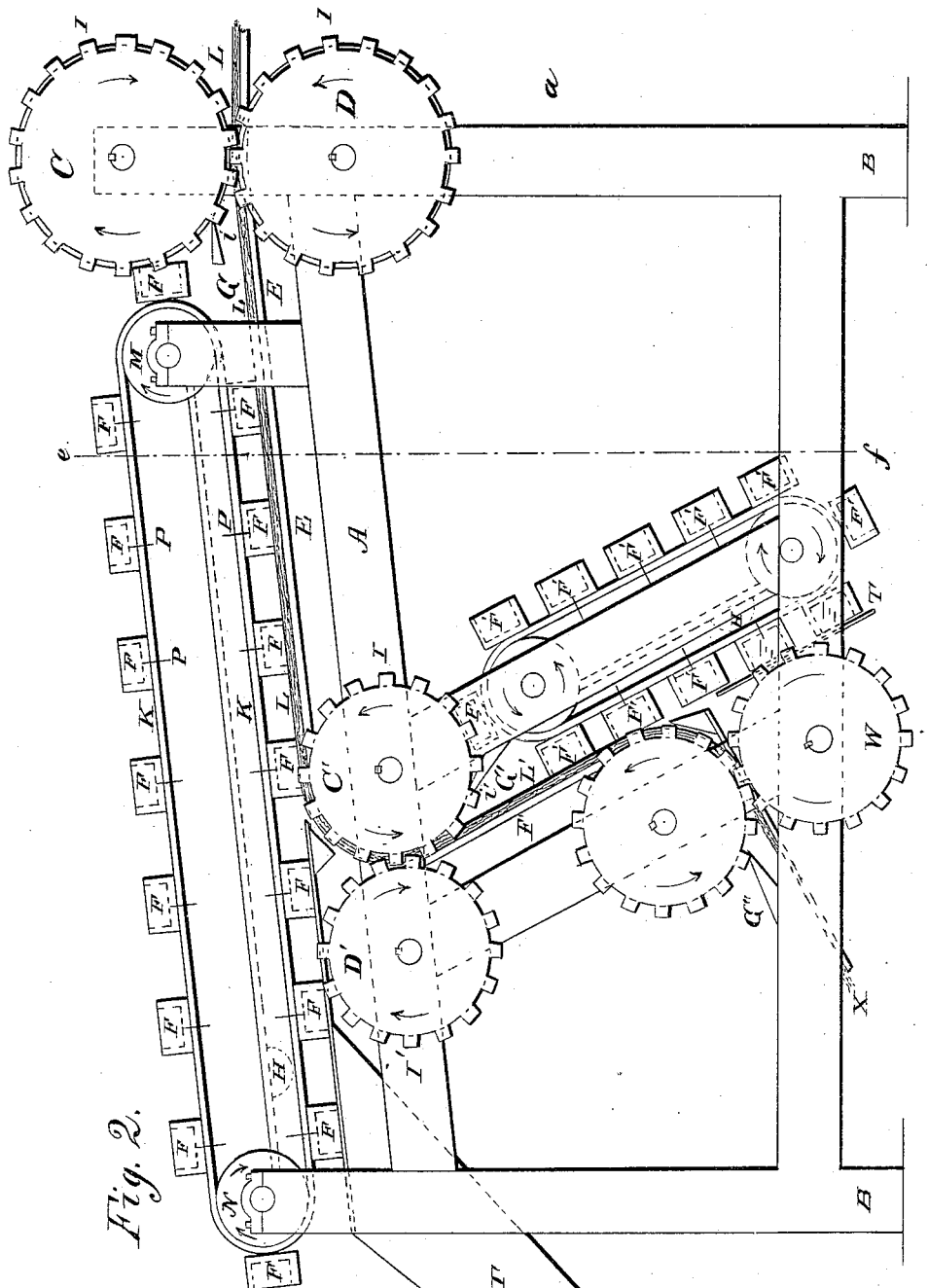
Figure 3:
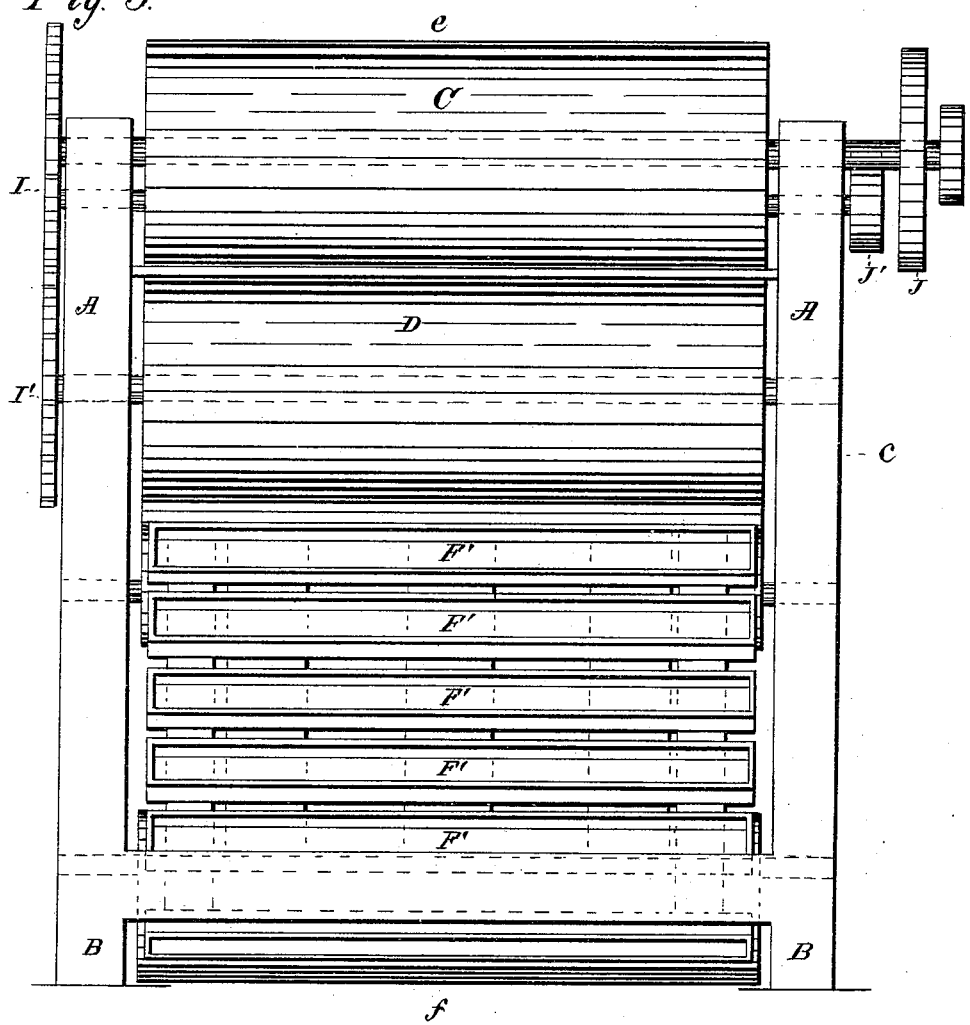
Figure 4:
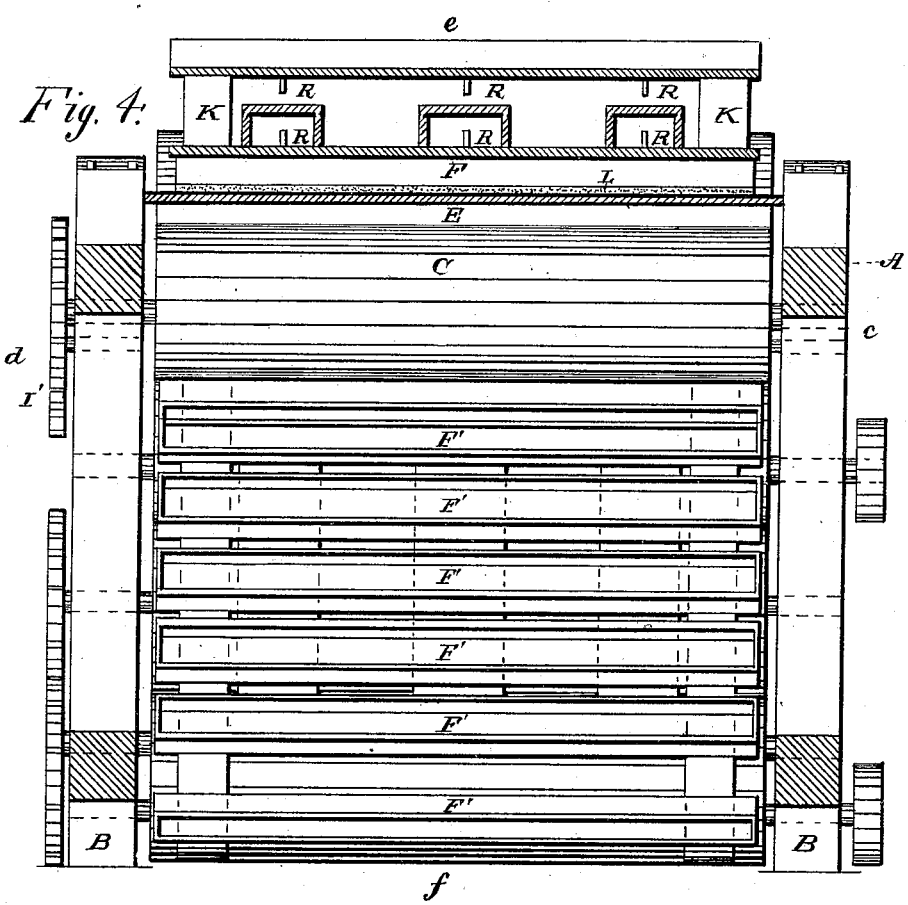
Figures 5, 6:
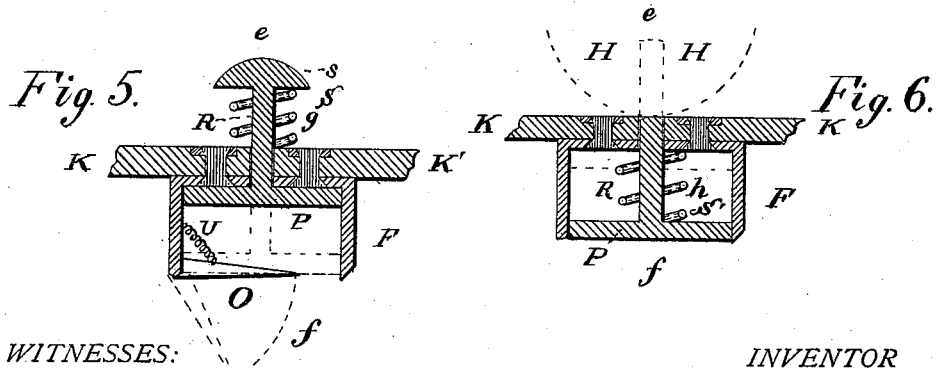

Figure 1 is a plan view, $a\ b\ c\ d$; Fig. 2, a side elevation, $a\ b\ e\ f$; Fig. 3, an end view of feed end of machine, $c\ d\ e\ f$; Fig. 4, a vertical transverse section at $e\ f$, Fig. 2, looking from feed end of machine, $a$, toward delivery end of machine, $b$; Fig. 5, a tranverse section $e\ f$, Fig. 1, through one form of self-cleaning scraper F, with spiral spring S above scraper shown as in use; Fig. 6, a transverse section of another form of self-cleaning scraper F, with spiral spring S inside of scraper and cleaning-piston R depressed by cam H, Fig. 2.

Similar letters refer to similar parts throughout the several views.

Attempts have been made to remove the bark or cuticle of these species of plants by other methods, but as far as known to me with only partial success, while by my invention I claim that a thorough disintegration of the plant and removal of the bark or cuticle is effected, leaving the fibrous materal in a perfect condition, and ready for any subsequent process which will fit it for the loom or other use.

In my invention the table or frame A, Figs. 1, 2, 3, and 4, with its legs B B, same figures, constitutes the frame-work of the machine, which supports the feed or grip rollers C D C' D', Figs. 1, 2, and 3, supporting-surfaces or cleaning-tables E E', Figs. 2, 3, and 4, or drums, self-cleaning traveling scrapers F F F F' F' F', Figs. 1, 2, 3, and 4, feed-roller cleaners G G', Fig. 2, cams H H', Figs. 2 and 6, gearing I I', Figs. 1, 2, 3, and 4, and belts J J', Fig. 1, for operating the same, two sets of each being arranged on each machine—one set, C, D, E, F, G, H, I, and J, Figs. 1, 2, 3, and 4, being used for decorticating one side of the plant or leaf, the other set, C', D', E', F', G', H', I', and J', Figs. 1, 3, and 4, being used for decorticating the other side of the plant or leaf.

The operation of the machine is as follows: The plant or leaf L, Fig. 2, to be decorticated is fed to the feed or grip rollers C D, Figs. 1, 2, and 3, from which it passes between the cleaning-table E, Figs. 2 and 4, or revolving drum and the self-cleaning traveling scrapers F F F F, Figs. 1, 2, 4, 5, and 6, which latter travel at a higher rate of speed than the grip-rollers C D, Figs. 1, 2, and 3, which hold the plant or leaf L, Fig. 2, firmly in tension while the traveling scrapers are removing the cuticle from one side of the plant or leaf. After this has been done, the plant or leaf passes by a continuous process between the second set of similar feed or grip rollers, C' D', Figs. 2 and 4, and traveling scrapers F' F' F' F', Figs. 2, 3, and 4, arranged to remove the cuticle from the opposite side of the plant or leaf.

The self-cleaning traveling scrapers are arranged on a traveling belt or belts, K, Figs. 1, 2, 4, 5, and 6, which pass around two pulleys, M N, Figs. 1, 2, and 4, and contain sliding pistons P, Figs. 2, 5, and 6, with rods R, Figs. 2, 5, and 6, the pistons being held back in the scrapers by springs S S', Figs. 5 and 6, except when passing under the cams H H', Figs. 2 and 6, which push down the piston-rods R and pistons P.

In Fig. 5 I show a form of scraper with a hinged flap, O, with spring U, to retain the bark or cuticle scraped from the leaf or plant until it is pushed from the scraper by the piston P, the flap being pushed open when the piston P is pushed down by the cam H H', allowing the bark or cuticle to be dumped into waste-troughs T T', Figs. 1 and 2.

In order to prevent the fiber of the plant or leaf from adhering to and passing around the feed-rollers C D C' D', Figs. 1, 2, and 3, cleaners G G G' G' are arranged at suitable points, $i\ i'$, Fig. 2, to scrape it off after it has passed between the grip-rollers C D C' D', the edges of the cleaning-tables E E' preventing the fiber from adhering to and passing around the rollers C D C' D'.

The feed or grip rollers and traveling scraper-pulleys M N M' N' are suitably geared or otherwise connected, in order to be driven at the speeds which are found best in practice, as shown by the drawings. The speed of the pulleys M N M' N', carrying the scraper-belts K K', is about twice that of the feed or grip rollers C D C' D'.

The fibrous material after being decorticated by the two sets of grip-rollers and traveling scrapers, as above described, is carried from them by the two delivering-rollers V W, Fig. 2, to the delivery-table X, Fig. 2, cleaners G'', Fig. 2, being arranged to clean the delivery-rollers V W in the same way as those described for the feed-rollers C D C' D' and for the same purpose.

The feed-rollers C D C' D' are driven in the directions shown by the arrows by suitably-arranged belting or gearing I I I' I', Fig. 1, the mode shown in the drawings being convenient.

The traveling scraper-pulleys M N M' N', Figs. 1, 2, may be driven from the feed-pulley shaft Y, Fig. 1, by gearing or belting J, Fig. 1, the second set being driven in the same manner as the first set.

The blades of the traveling scrapers may be made adjustable, for the purpose of being repaired and sharpened, and may extend the full width of the machine, as at F F F F' F' F', Figs. 1, 3, and 4, or may be made in several sections, as shown by the dotted lines at F'' F'' F'', Fig. 1. Where a traveling scraper with a spring, g, on top of the belt K K' and between it and the scraper-pulleys M N M' N', as in Fig. 5, is used, grooves j, Fig. 1, sufficiently large and deep should be made in the pulleys M N, Fig. 1, to allow the piston-rod head s, Fig. 5, and spring S, Fig. 5, to pass without undue interference.

Where the character of the material to be decorticated may render it desirable, a revolving drum suitably connected by gearing or belting with other portions of the machine may be substituted for the cleaning-tables E E' as a supporting-surface for the plant or leaf under treatment; but I prefer to use the cleaning-tables E E', as shown and described.

The grip or feed rollers C D C' D' may be made either smooth or corrugated, as may be required for the best treatment of the species of plant to be decorticated.

Having thus described my invention, what I claim, and desire to secure by Letters Patent, is—

1. The combination of the grip or feed rollers with the supporting-surface, roller-cleaners, cams, and traveling scrapers arranged on a movable belt, together with suitable mechanism for operating the same, substantially as described, and for the purpose set forth.

2. The traveling scraper with automatic cleaner on a movable belt, as and for the purpose described.

3. The traveling scraper, in combination with spring-flap and automatic cleaner, substantially as described.

H. S. WOODWARD.

Witnesses:
C. HENRY RONEY,
ROBT. M. FOUST.